(12) United States Patent
Morris et al.

(10) Patent No.: US 11,188,249 B2
(45) Date of Patent: Nov. 30, 2021

(54) STORAGE ALTERATION MONITORING

(71) Applicant: INTERNATIONAL BUSINESS MACHINES CORPORATION, Armonk, NY (US)

(72) Inventors: Joshua Morris, London (GB); Neil William Leedham, Bursledon (GB); Matthew Sunley, Allbrook (GB); Neil Kenneth Johnston, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 16/695,424

(22) Filed: Nov. 26, 2019

(65) Prior Publication Data

US 2021/0157507 A1    May 27, 2021

(51) Int. Cl.
G06F 3/06    (2006.01)

(52) U.S. Cl.
CPC .......... G06F 3/0653 (2013.01); G06F 3/0604 (2013.01); G06F 3/0673 (2013.01)

(58) Field of Classification Search
CPC ..... G06F 3/0604; G06F 3/0653; G06F 3/0673
See application file for complete search history.

(56) References Cited

U.S. PATENT DOCUMENTS

| 9,619,346 | B2 | 4/2017 | Pape |
| 2016/0011893 | A1 | 1/2016 | Strong |
| 2018/0113809 | A1 | 4/2018 | Mola |

OTHER PUBLICATIONS

Mell et al., "The NIST Definition of Cloud Computing", National Institute of Standards and Technology, Special Publication 800-145, Sep. 2011, 7 pages.

*Primary Examiner* — Yong J Choe
(74) *Attorney, Agent, or Firm* — Rakesh Roy (57) ABSTRACT

A computer-implemented method, a computer system, and a computer program product for data storage alteration monitoring is provided. The present invention may include, obtaining a page record, wherein the page record includes, for an event monitor having an associated target memory address to be monitored for changes, an entry identifying an associated page of a secondary data storage containing the associated target memory address. The present invention may also include, responsive to identifying a first event monitor having an associated first target memory address to be monitored for changes, analyzing the obtained page record to identify a first page containing the first target memory address. The present invention may further include, controlling enablement of the first event monitor based on whether the first page, identified in the analyzed page record, is loaded into a physical main memory of the computer system.

20 Claims, 5 Drawing Sheets

STORAGE ALTERATION MONITORING

BACKGROUND

The present invention relates generally to the field of computer systems, and more particularly to data storage technology.

Diagnosis of problems encountered during the execution of computing applications often relies on the collection of supporting documentation such as message logs and system dumps and traces to help identify the cause of the problem. This type of documentation can be collected ordinarily in the running of the application, either by default or in response to the setting of the relevant service parameters. In some cases, particularly when standard documentation may prove to be insufficient to identify the issue, event monitoring may be employed to establish early symptoms of the problem and produce additional documentation.

SUMMARY

Embodiments of the present invention disclose a computer-implemented method, a computer system, and a computer program product for data storage alteration monitoring. The present invention may include, obtaining a page record, wherein the page record includes, for an event monitor having an associated target memory address to be monitored for changes, an entry identifying an associated page of a secondary data storage containing the associated target memory address. The present invention may also include, responsive to identifying a first event monitor having an associated first target memory address to be monitored for changes, analyzing the obtained page record to identify a first page containing the first target memory address. The present invention may further include, controlling enablement of the first event monitor based on whether the first page, identified in the analyzed page record, is loaded into a physical main memory of the computer system.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

In the context of the present application, where embodiments of the present invention constitute a method, it should be understood that such a method may include a process for execution by a computer, e.g., a computer-implementable method. The various steps of the method may therefore reflect various parts of a computer program, e.g. various parts of one or more algorithms.

Also, in the context of the present application, a system may include a single device or a collection of distributed devices that may be adapted to execute one or more embodiments of the methods of the present invention. For instance, a system may include a personal computer (PC), a server, or a collection of PCs and/or servers connected via a network such as a local area network, the Internet, and so on to cooperatively execute at least one embodiment of the methods of the present disclosure. Further, a component may include an integration flow that may be executed by one or more processing units.

As described previously, diagnosis of problems encountered during the execution of computing applications often relies on the collection of supporting documentation such as message logs and system dumps and traces to help identify the cause of the problem. This type of documentation can be collected ordinarily in the running of the application, either by default or in response to the setting of the relevant service parameters. In some cases, particularly when standard documentation may prove to be insufficient to identify the issue, event monitoring may be employed to establish early symptoms of the problem and produce additional documentation.

An example of this additional documentation may include a standard system dump taken closer to the time of the original failure, so that its contents may be more representative of the environment which gave rise to the problem.

For this purpose, system support commands that provide an event monitor, a diagnostic aid that intercepts (or "traps") certain system events, allows a user to specify what action to take. A facility offered by one such command may include Storage Alteration (SA) monitoring. In setting a SA event monitor (e.g., SA trap), an address in memory to be monitored may be specified. The specified address in memory may then be checked following the execution of every instruction that the CPU performs. If the contents of the memory address change such that the event monitoring criteria are met, a system dump may be obtained. This provides a snapshot of the system at the point when something was written to the specified address in memory, and this may assist in the diagnosis of a problem.

Checking memory after every instruction execution severely impacts performance. For this reason, SA event monitors (e.g., SA Traps) are rarely used (despite their potential benefit).

Reference to an event monitor may include a tool or command that is typically provided by a computer or Operating System (OS) for intercepting or trapping certain system events. The event monitor may also allow a user to specify what action to take in response to an event occurrence. An example of such a tool or command is the SLIP (Serviceability Level Indication Processing) command that is provided by the IBM® (IBM and all IBM-based trademarks and logos are trademarks or registered trademarks of International Business Machines Corporation and/or its affiliates) z/OS® (z/OS and all IBM-based trademarks and logos are trademarks or registered trademarks of International Business Machines Corporation and/or its affiliates). The SLIP command facilitates a SA Slip Trap (e.g., SA event monitor) which checks an associated target memory address (e.g., user-specified address) following the execution of every instruction performed by the system. If the contents of the target memory address change such that criteria of the SLIP command are met, a system dump is obtained.

Proposed are concepts for controlling data storage alteration monitoring in a computer system that employs a physical main memory and memory paging to store and retrieve data from a secondary data storage for use in the physical main memory. It is proposed to take advantage of the known memory management scheme of paging (or "virtual paging") so as to reduce or remove performance drawbacks associated with employing a conventional SA event monitor that checks memory after every instruction execution.

Paging is a memory management scheme by which a computer stores and retrieves data from secondary data storage for use in main memory. In a paging scheme, the OS retrieves data from secondary data storage in same-size blocks called pages. Pages are moved in to physical main/core memory from secondary (e.g., offline) storage as and when they are needed by a program, and then pages are moved out from the physical main/core memory once they are no longer required. This allows the program to work with a virtual address space much larger than would be allowed by the constraints of the physical main memory. Paging therefore uses secondary data storage to enable computer programs to exceed the size of available physical main memory.

According to one embodiment, enablement (e.g., enable or disable) of a SA event monitor (such as a SLIP trap) may be controlled based on whether the page containing the monitored memory address is loaded into the physical main memory.

Put another way, embodiments may be configured such that, when an event monitor is set or defined, the event monitor may not be enabled straight away depending on whether the page containing the target memory address of the event monitor is currently loaded in the physical main memory. Instead, an entry may be made in a record (e.g., a list, table, index, database, or other suitable collection of information) and, for each event monitor, the record may store the target memory address to be monitored. Then, when the target memory address is referenced and the page containing it is loaded to the physical main memory by the paging mechanism, a proposed embodiment may check the record and, if present, the event monitor may be enabled. Also, when the page is later unloaded from the physical main memory, the record may be checked to see if the page contains a target memory address and, if so, a proposed embodiment may disable the event monitor.

Proposed embodiments may therefore be configured such that a target memory address of a SA event monitor may only be monitored (e.g., checked for alterations) when it is loaded into a physical main memory of the computer system. This may be particularly beneficial for memory addresses that are infrequently referenced, for example, located in obscure storage that is accessed once a year when busy.

Embodiments may therefore reduce or remove the performance impediment associated with using SA event monitors (such as SA Slip Traps), thereby improving the performance of a system in which they employed. Embodiments may therefore make the use of SA event monitors practical, even for infrequent storage corruption issues.

In particular, proposed embodiments may provide concepts for controlling data storage alteration monitoring in a computer system that employs a physical main memory and memory paging to store and retrieve data from a secondary data storage for use in the physical main memory. Such concepts may firstly obtain a page record, wherein the page record comprises, for each event monitor having an associated target memory address to be monitored for changes, an entry identifying a page of secondary data storage containing the target memory address. Then, responsive to a first event monitor having an associated first target memory address to be monitored for changes, the page record may be analyzed to identify a page containing the first target memory address. The first event monitor may then be enabled or disabled depending on whether the identified page is loaded into the physical main memory.

For example, the first event monitor may be enabled if the identified page is loaded into the physical main memory, and the first event monitor may be disabled if the identified page is not loaded into the physical main memory.

Further, controlling enablement of the first event monitor may comprise determining if the identified page is loaded into the physical main memory based on the value of a flag associated with the first event monitor.

Some embodiments may further comprise, responsive to loading a page into the physical main memory, setting, to a first value, a first flag associated with an event monitor having an associated target memory address in the page. Also, responsive to unloading the page from the physical main memory, the first flag may be set to a second different value, the first flag. In this way, a simple flag or binary field may be employed for identifying when a page is loaded into the physical main memory.

In some embodiments, the page record may be maintained based on one or more defined event monitors. For instance, maintaining the record of page addresses may comprise, responsive to a first event monitor being defined, the first event monitor having an associated first target memory address to be monitored for changes: defining a first entry identifying a page address of a memory page containing the first target memory address; and adding the first entry to the record of page addresses.

In an example embodiment, when enabled, the first event monitor may be configured to execute a system dump responsive to a change occurring at the first target memory address.

Embodiments may therefore provide a system for controlling data storage alteration monitoring in a computer system. Illustrative embodiments may control enablement of a first event monitor based on whether a page containing the target memory address of the first event monitor is loaded into the physical main memory of the computer system. Dynamic and/or automatic enablement of event monitoring may therefore be provided by proposed embodiments.

Figure 1:
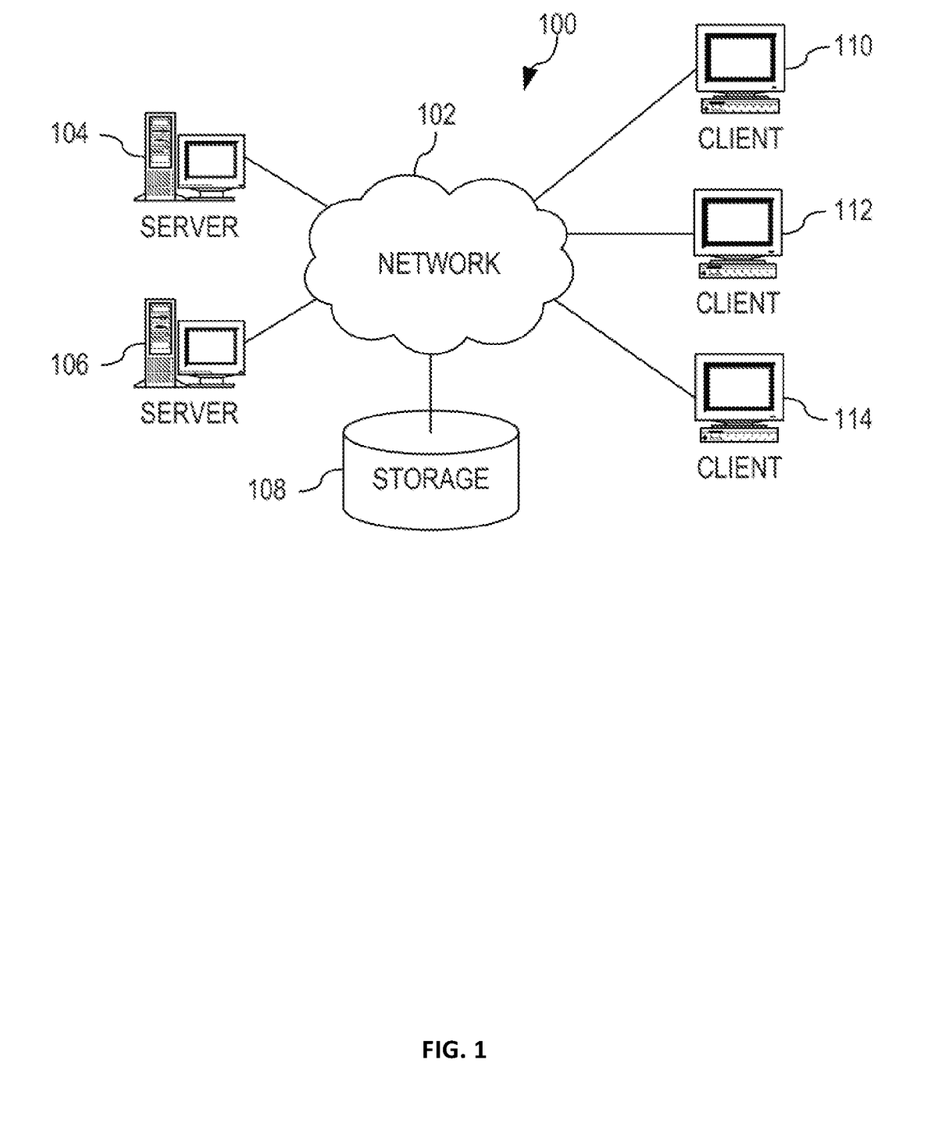
FIG. 1 illustrates a distributed system according to at least one embodiment.

Referring to FIG. 1, an exemplary distributed system 100 in accordance with one embodiment is depicted. The distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, first server 104 and second server 106 may be connected to the network 102 along with a storage unit 108. In addition, clients (e.g., client computers) 110, 112, and 114 may be also connected to the network 102. The clients 110, 112, and 114 may include edge devices, for example, personal computers, network computers, Internet of Things (IoT) devices, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Those of ordinary skill in the art will appreciate that the hardware in FIG. 1 may vary depending on the implementation. Also, the processes of the illustrative embodiments may be applied to a multiprocessor data processing system, other than the system mentioned previously, without departing from the scope of the present invention.

Moreover, embodiments may take the form of any of a number of different data processing systems including client computing devices, server computing devices, a tablet computer, laptop computer, telephone or other communication device, a personal digital assistant (PDA), or the like. In some illustrative examples, a system according to an embodiment may be a portable computing device that is configured with flash memory to provide non-volatile memory for storing operating system files and/or user-generated data, for example. Thus, a system according to a proposed embodiment may essentially be any known or later-developed data processing system without architectural limitation.

As detailed above, proposed embodiments provide a method, a system, and a computer program product for controlling SA monitoring in a computer system that employs a physical main memory and memory paging to store and retrieve data from a secondary data storage for use in the physical main memory. Various embodiments are explained in more detail below with reference to FIG. 2.

Figure 2:
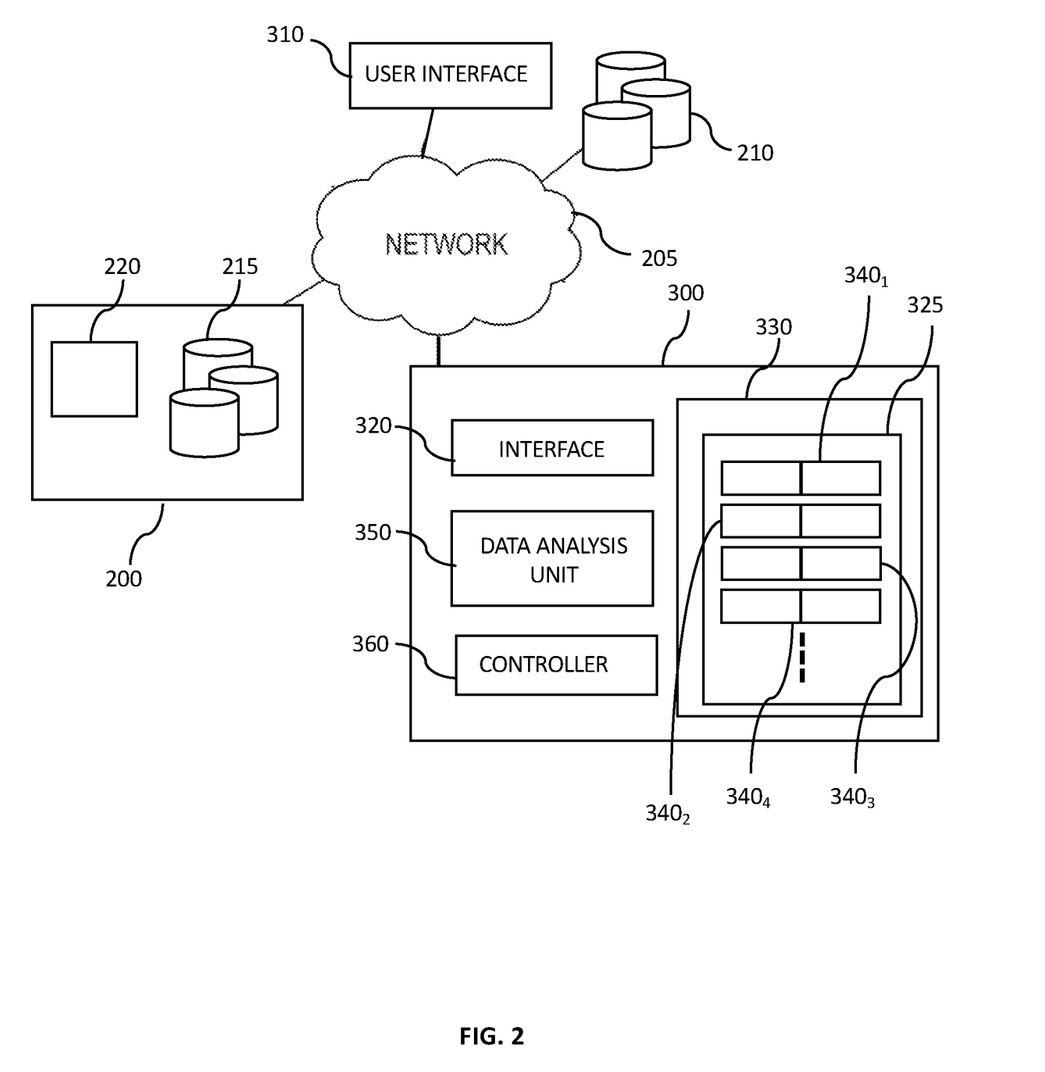
FIG. 2 illustrates a schematic diagram of a distributed computing system for data storage alteration monitoring according to at least one embodiment.

Referring to FIG. 2, a schematic diagram of a proposed distributed computing system according to at least one embodiment is depicted. The distributed computing system includes a computer system 200 that employs a paging scheme to retrieve data (via a network 205) from (remotely located) secondary data storage 210 in same-size blocks called pages. Pages are moved in to physical main/core memory 215 of the system computer system 200 from the secondary (remote) storage 210 as and when they are needed by a program 220 of the computer system 200, and then pages are moved out from the physical main/core memory 215 once they are no longer required.

The distributed computing system also includes a system 300 for controlling data storage alteration monitoring in the computer system 200 according to an embodiment.

In this example, the distributed computing system further includes a user interface 310. The user interface 310 is configured to enable a user to define event monitors each having an associated target memory address of the system 200 to be monitored for changes. Using the user interface 310, a user employs a tool or command provided by the operating system of the computer system 200 for intercepting or trapping certain system events. An example of such a tool or command is a SLIP (Serviceability Level Indication Processing) command that is provided by the IBM® z/OS®. The SLIP command provides for a SA Slip Trap (e.g., SA event monitor) which is configured to checks an associated target memory address (e.g., user-specified address) following the execution of every instruction performed by the computer system 200. If the contents of the target memory address change such that criteria of the SLIP command are met, a system dump is obtained.

The system 300 for controlling data storage alteration monitoring in the computer system 200 comprises an interface 320 configured to obtain a page record 325. In this example, the system 300 includes a record maintenance component 330 that is configured to maintain (e.g., store and update) the page record 325 based on event monitors defined by a user (via the user interface 310).

The page record 325 comprises, for each event monitor having an associated target memory address to be monitored for changes, an entry 340 identifying a page of secondary data storage containing the target memory address. For example, for a first event monitor having an associated first target memory address to be monitored, the page record 325 includes a first entry $340_1$ identifying a page of the secondary data storage 210 containing the first target memory address. For a second event monitor having an associated second target memory address to be monitored, the page record 325 includes a second entry $340_2$ identifying a page of the secondary data storage 210 containing the second target memory address. Similarly, for a third event monitor having an associated third target memory address to be monitored, the page record 325 includes a third entry $340_3$ identifying a page of the secondary data storage 210 containing the third target memory address. Further, for a fourth event monitor having an associated fourth target memory address to be monitored, the page record 325 includes a fourth entry $340_4$ identifying a page of the secondary data storage 210 containing the fourth target memory address. According to one embodiment, the page record 325 may include a table or list having a plurality of event monitors and their associated target memory addresses.

The system 300 for controlling data storage alteration monitoring in the computer system 200 also comprises a data analysis unit 350. The data analysis unit 350 is configured to, responsive to identifying an event monitor having an associated target memory address to be monitored for changes, analyze the page record 325 to identify a page containing the target memory address associated with the identified event monitor. For instance, responsive to identifying the third event monitor, the data analysis unit 350 analyzes the page record 325 to identify the third entry $340_3$ which, in turn, identifies the page of the secondary data storage 210 containing the third target memory address that is associated with the third event monitor.

A controller 360 of the system 300 is then configured to control enablement of the identified event monitor based on whether the identified page is loaded into the physical main memory. Specifically, in this exemplary embodiment, the controller 360 is configured to enable the identified event monitor if the identified page is loaded into the physical main memory 215. The controller 360 is also configured to disable the identified event monitor if the identified page is not loaded into the physical main memory 215.

For instance, the controller 360 is configured to control enablement of the third event monitor based on whether or not the page of the secondary data storage 210 containing the third target memory address is loaded into the physical main memory 215. For example, controller 360 is configured to enable the third event monitor if the page of the secondary data storage 210 containing the third target memory address is loaded into the physical main memory 215. The controller 360 is also configured to disable the third event monitor if the page of the secondary data storage 210 containing the third target memory address is not loaded into the physical main memory 215.

By way of example, the controller may use flag value to determine if particular page is loaded into the physical main memory 215 of the computer system 200. A flag value may, for example, be associated with each event monitor that is defined. For instance, responsive to loading a page into the physical main memory 215, a first flag associated with a first event monitor having a first target memory address in the page may be set to a first value. Also, responsive to unloading the page from the physical main memory 215, the first flag may be set to a second different value. In this way, a simply binary flag may be used to indicate if a page is loaded in the physical main memory 215.

By way of further explanation and illustration of the proposed concepts, we will now detail an implementation of exemplary stages of an embodiment wherein an event monitor is provided by a SLIP command that is offered by the IBM® z/OS®.

Enabling

Specify new parameter when setting the SLIP command. For example, the command may be as follows: SET SLIP, SA {TARGET ADDRESS} {TEST} {ACTION} {*SAM FLAG*} on console, where {*SAM FLAG*} is a Storage Alteration Monitoring (SAM) flag. The flag invokes a SAM component of the operating system which adds a new entry in a page table which details the target memory address to be monitored.

Normal Operation (e.g., Once the SAM SA SLPI Command is Set)

A check is completed to if a page including a target memory address is already loaded in physical main memory. If yes, the SAM SA event monitor (e.g., Slip Trap) is enabled and placed in an "active" (e.g., enabled) state. If no, the SAM SA event monitor is disabled (e.g., placed in an "idle" state) awaiting a page containing the target address to be loaded in physical main memory.

A program request causes a new page to be loaded.

The page table is checked to see if the page contains a target memory address associated with a SAM SA event monitor. If the page does contain a target memory address present, the associated SAM SA event monitor is enabled and placed in an "active" state.

A Program Request Causes a Page to be Unloaded.

When a page is unloaded from the physical main memory, the SAM SA event monitor(s) associated with one or more target memory address in the page are disabled (e.g., placed in an "idle" state).

Disabling (Manual Switch Off) of a SAM SA Event Monitor

The entry associated with the event monitor is removed from the page record.

From the above description, it will be appreciated that proposed embodiments may be configured to provide extended functionality in a data storage alteration monitoring system. Such functionality may drive the definition or modification of an event monitor. Also, memory paging operations (such as storage and retrieval of pages from a secondary data storage) may drive aspects of proposed embodiments. This functionality may then automatically control data storage alteration monitoring, e.g., through dynamic and automated enablement/disablement of an event monitor.

Embodiments leverage a realization that memory paging mechanisms may mean that a target memory address to be monitored may not always be loaded in a physical main memory of a computer system. By only enabling an event monitor when a page containing the target memory address of the event monitor is loaded in the physical main memory, proposed embodiments may reduce or remove the performance drawbacks associated with employing a conventional SA event monitor that checks memory after every instruction execution.

Figure 3:
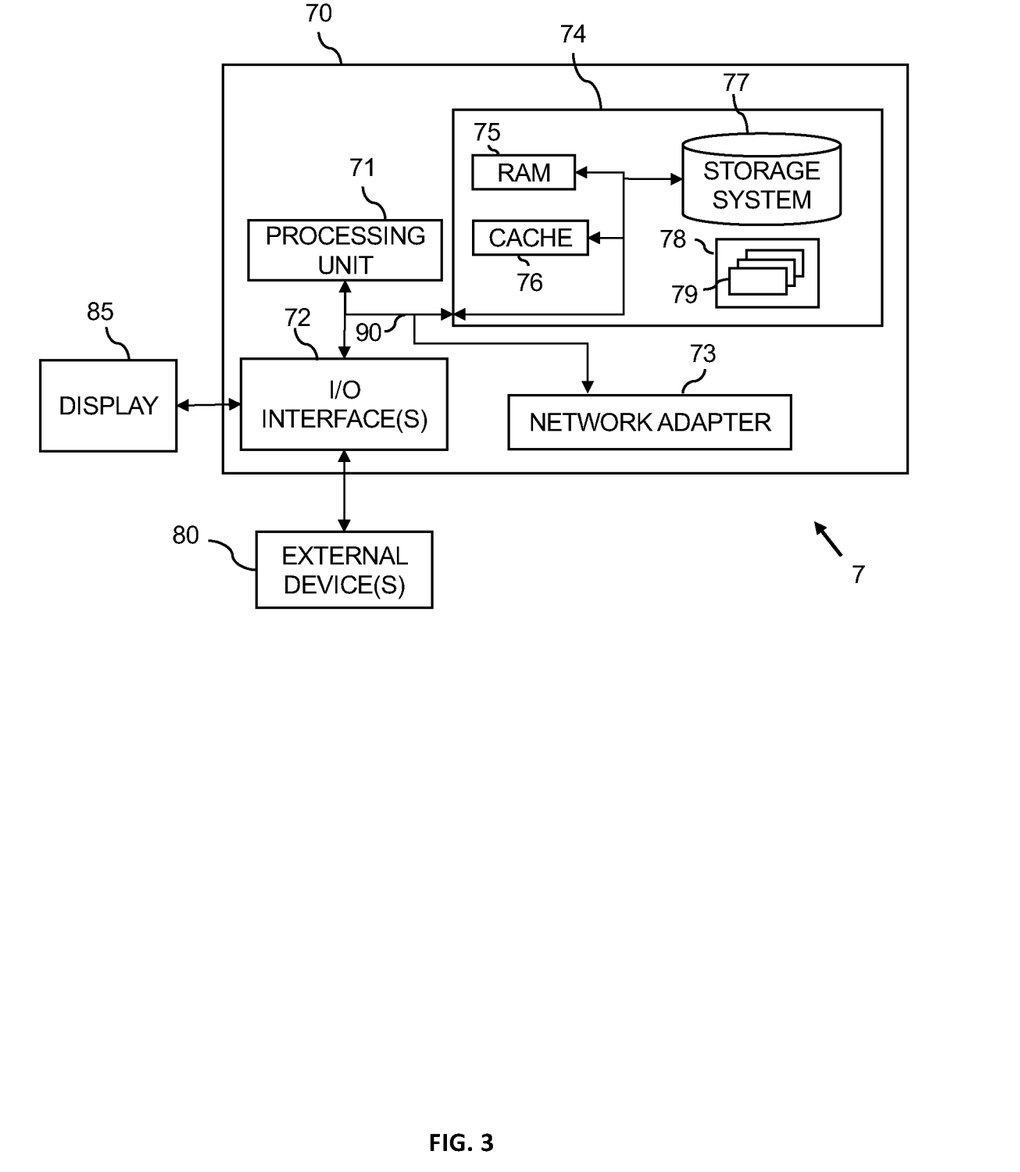
FIG. 3 illustrates a schematic diagram of the components of computer and servers in an exemplary system according to at least one embodiment.

Referring now to FIG. 3, a computer system 70 which may form part of a networked system 7 according to at least one embodiment is depicted. For instance, a data analysis unit according to an embodiment may be implemented in the computer system 70 (e.g., as a processing unit 71). The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the Input/Output (I/O) interface 72 perform a method for controlling data storage alteration monitoring in a computer system according to a proposed embodiment. Program/utility 78, having a set (at least one) of program modules 79, may be stored in memory 74. Program modules 79 generally carry out the functions and/or methodologies of proposed embodiments for partial write operations to memory.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g., to communicate determined optimal values of DFWF to edge devices of a distributed network).

In the context of the present application, where embodiments of the present invention constitute a method, it should be understood that such a method is a process for execution by a computer, e.g., is a computer-implementable method. The steps of the method therefore reflect various parts of a computer program, e.g., parts of one or more algorithms.

The present invention may be a system, a method, and/or a computer program product at any technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, Python, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
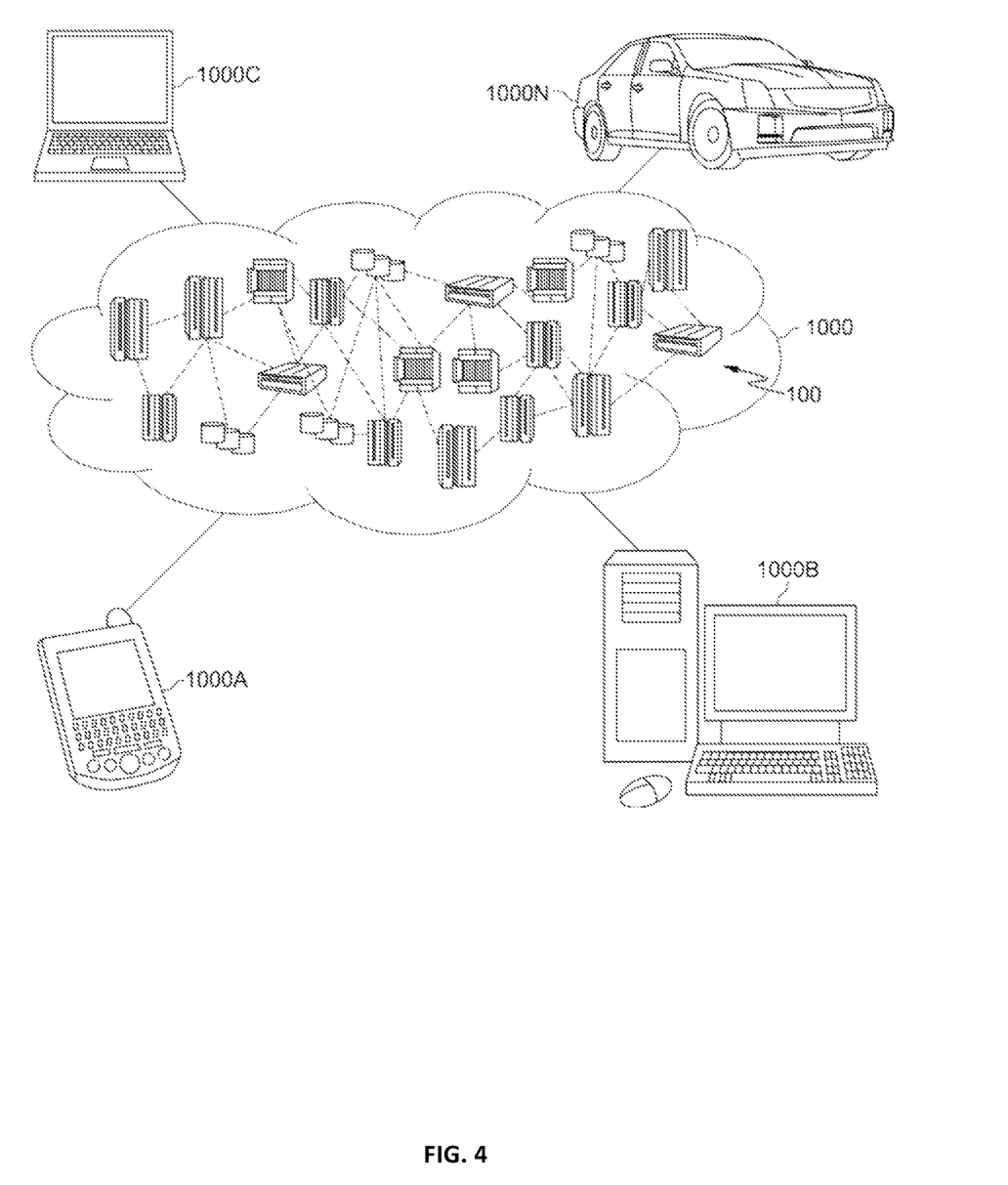
FIG. 4 is a block diagram of an illustrative cloud computing environment including the system depicted in FIG. 1, in accordance with an embodiment of the present disclosure.

Referring now to FIG. 4, illustrative cloud computing environment 1000 is depicted. As shown, cloud computing environment 1000 comprises one or more distributed systems (e.g., cloud computing nodes) 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
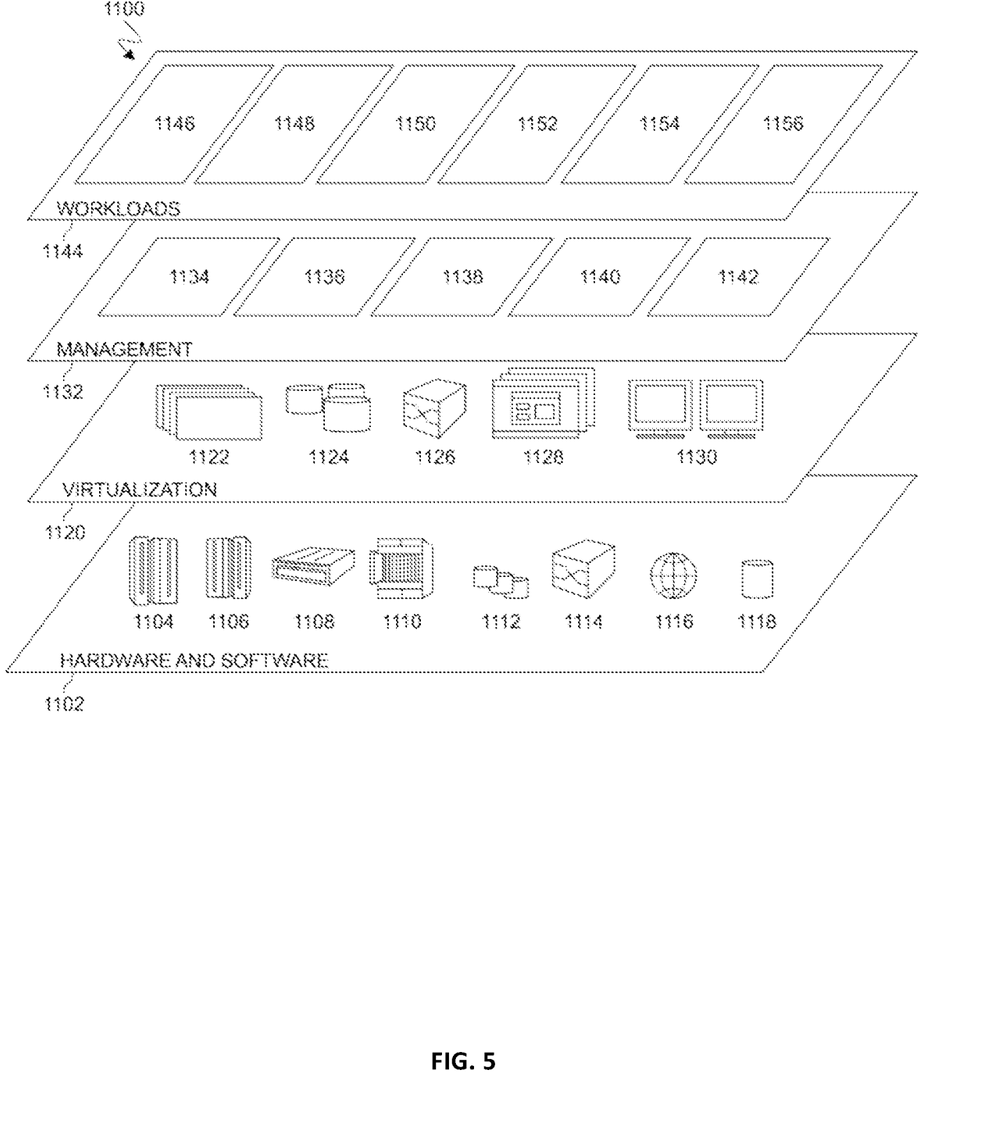
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and storage alteration monitoring 1156. A data storage alteration monitoring program provides a way to control SA monitoring in a computer system that employs a physical main memory and memory paging to store and retrieve data from a secondary data storage for use in the physical main memory.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method comprising:
   obtaining a page record, wherein the page record includes, for each event monitor having an associated target memory address to be monitored for changes, an entry identifying an associated page of a secondary data storage containing the associated target memory address;
   responsive to identifying a first event monitor having an associated first target memory address to be monitored for changes, analyzing the obtained page record to identify a first page containing the first target memory address; and
   controlling enablement of the first event monitor based on whether the first page, identified in the analyzed page record, is loaded into a physical main memory of a computer system.

2. The method of claim 1, wherein the computer system includes memory paging to store and retrieve a data from the secondary data storage for use in the physical main memory.

3. The method of claim 1, wherein controlling enablement of the first event monitor further comprises:
   in response to determining that the first page is loaded into the physical main memory, enabling the first event monitor.

4. The method of claim 1, wherein controlling enablement of the first event monitor further comprises:
   in response to determining that the first page is not loaded into the physical main memory, disabling the first event monitor.

5. The method of claim 3, wherein controlling enablement of the first event monitor further comprises:
   determining if the first page is loaded into the physical main memory based on a value of a flag associated with the first event monitor.

6. The method of claim 1, further comprising:
   responsive to loading the first page into the physical main memory, setting, to a first value, a first flag associated with the first event monitor having the associated first target memory address in the first page; and
   responsive to unloading the first page from the physical main memory, setting the first flag to a second value different from the first value.

7. The method of claim 1, further comprising:
   maintaining the page record based on at least one defined event monitor.

8. The method of claim 7, wherein maintaining the page record further comprises:
   responsive to the first event monitor being defined, wherein the first event monitor includes the associated first target memory address to be monitored for changes, defining a first entry identifying a page address of a memory page containing the first target memory address; and
   adding the defined first entry to the page record.

9. The method of claim 3, further comprising:
   in response to enabling the first event monitor, executing a system dump responsive to a change occurring at the first target memory address.

10. A computer system for data storage alteration monitoring, comprising:
    one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
    obtaining a page record, wherein the page record includes, for each event monitor having an associated target memory address to be monitored for changes, an entry identifying an associated page of a secondary data storage containing the associated target memory address;

responsive to identifying a first event monitor having an associated first target memory address to be monitored for changes, analyzing the obtained page record to identify a first page containing the first target memory address; and controlling enablement of the first event monitor based on whether the first page, identified in the analyzed page record, is loaded into a physical main memory of the computer system.

11. The computer system of claim 10, wherein the computer system includes memory paging to store and retrieve a data from the secondary data storage for use in the physical main memory.

12. The computer system of claim 10, wherein controlling enablement of the first event monitor further comprises:

in response to determining that the first page is loaded into the physical main memory, enabling the first event monitor.

13. The computer system of claim 10, wherein controlling enablement of the first event monitor further comprises:

in response to determining that the first page is not loaded into the physical main memory, disabling the first event monitor.

14. The computer system of claim 12, wherein controlling enablement of the first event monitor further comprises:

determining if the first page is loaded into the physical main memory based on a value of a flag associated with the first event monitor.

15. The computer system of claim 10, further comprising:

responsive to loading the first page into the physical main memory, setting, to a first value, a first flag associated with the first event monitor having the associated first target memory address in the first page; and responsive to unloading the first page from the physical main memory, setting the first flag to a second value different from the first value.

16. The computer system of claim 10, further comprising:

maintaining the page record based on at least one defined event monitor.

17. The computer system of claim 16, wherein maintaining the page record further comprises:

responsive to the first event monitor being defined, wherein the first event monitor includes the associated first target memory address to be monitored for changes, defining a first entry identifying a page address of a memory page containing the first target memory address; and adding the defined first entry to the page record.

18. The computer system of claim 12, further comprising:

in response to enabling the first event monitor, executing a system dump responsive to a change occurring at the first target memory address.

19. A computer program product for data storage alteration monitoring, the computer program product comprising:

one or more computer-readable storage media and program instructions collectively stored on the one or more computer-readable storage media, the program instructions comprising:

program instructions to obtain a page record, wherein the page record includes, for each event monitor having an associated target memory address to be monitored for changes, an entry identifying an associated page of a secondary data storage containing the associated target memory address;

program instructions to, responsive to identifying a first event monitor having an associated first target memory address to be monitored for changes, analyze the obtained page record to identify a first page containing the first target memory address; and program instructions to control enablement of the first event monitor based on whether the first page, identified in the analyzed page record, is loaded into a physical main memory of a computer system.

20. The computer program product of claim 19, wherein the computer system includes memory paging to store and retrieve a data from the secondary data storage for use in the physical main memory.

* * * * *